US009799965B2

(12) United States Patent
Ofenbakh

(10) Patent No.: US 9,799,965 B2
(45) Date of Patent: Oct. 24, 2017

(54) SYSTEM FOR COUPLING A CONDUCTIVE SUBSTRATE TO A RIBBON CABLE

(71) Applicant: Igor Ofenbakh, Morristown, NJ (US)

(72) Inventor: Igor Ofenbakh, Morristown, NJ (US)

( * ) Notice: Subject to any disclaimer, the term of this patent is extended or adjusted under 35 U.S.C. 154(b) by 214 days.

(21) Appl. No.: 14/280,569

(22) Filed: May 17, 2014

(65) Prior Publication Data

US 2015/0333465 A1 Nov. 19, 2015

(51) Int. Cl.

*B23P 19/00* (2006.01)
*H01R 43/04* (2006.01)
*H01R 4/18* (2006.01)
*H01R 13/629* (2006.01)
*H01R 12/67* (2011.01)
*H01R 12/68* (2011.01)
*H01R 43/048* (2006.01)

(52) U.S. Cl.

CPC ............. *H01R 4/18* (2013.01); *H01R 12/675* (2013.01); *H01R 12/68* (2013.01); *H01R 13/629* (2013.01); *H01R 43/048* (2013.01); *Y10T 29/4919* (2015.01); *Y10T 29/53235* (2015.01)

(58) Field of Classification Search

CPC ...... H01R 23/66; H01R 4/2495; H01R 43/01; H01R 43/048; H01R 12/69; H01R 9/0771; Y10T 29/53235; Y10T 29/53226; Y10T 29/53217; Y10T 29/5327; Y10T 29/5343; H01B 7/08

USPC ...... 29/753, 447, 560, 566.4, 749, 751, 761, 29/830, 857, 865; 439/325, 400, 422, 439/752

See application file for complete search history.

(56) References Cited

U.S. PATENT DOCUMENTS

| | | | | |
|---|---|---|---|---|
| 2,680,235 | A | 6/1954 | Pierce | |
| 3,162,501 | A | 12/1964 | Wahl | |
| 3,444,312 | A | 5/1969 | Over | |
| 3,541,226 | A | 11/1970 | Cea | |
| 3,621,117 | A | 11/1971 | Antas et al. | |
| 3,758,703 | A | 9/1973 | Golden | |
| 3,826,861 | A | 7/1974 | Karl | |
| 3,895,852 | A | 7/1975 | Wasserlein | |
| 4,027,521 | A | 6/1977 | McKee | |
| 4,068,912 | A | 1/1978 | Hudson | |
| 4,153,324 | A | 5/1979 | Kukla | |
| 4,179,964 | A | 12/1979 | Kirkgasser | |
| 4,259,778 | A * | 4/1981 | Greenwood | B26F 1/04 29/560 |
| 4,275,630 | A | 6/1981 | Goldsmith | |
| 4,304,454 | A | 12/1981 | Yokota | |
| 4,522,097 | A | 6/1985 | Adlon | |
| 4,806,120 | A | 2/1989 | Baker | |
| 4,973,261 | A | 11/1990 | Hatagishi | |
| 4,997,388 | A | 3/1991 | Dale | |
| 5,110,387 | A | 5/1992 | Jasinski | |
| 5,143,273 | A | 9/1992 | Topel | |
| 5,190,468 | A | 3/1993 | Nichols | |
| 5,484,305 | A | 1/1996 | Diniz | |
| 5,833,488 | A | 11/1998 | Roy | |
| 5,926,598 | A | 7/1999 | Klein | |

(Continued)

FOREIGN PATENT DOCUMENTS

WO WO 2012/12765 A1 1/2012

*Primary Examiner* — Thiem Phan
(74) *Attorney, Agent, or Firm* — Vadim A. Gordin

(57) ABSTRACT

Devices and methods are disclosed for coupling a multi-conductor cable to a flexible substrate by means of a crimp.

8 Claims, 7 Drawing Sheets

(56) References Cited

U.S. PATENT DOCUMENTS

| | | | | |
|---|---|---|---|---|
| 6,077,103 | A | 6/2000 | Saka | |
| 6,232,555 | B1 | 5/2001 | Besler | |
| 6,394,834 | B2 | 5/2002 | Fujimoto | |
| 6,718,815 | B2 | 4/2004 | Fantini | |
| 6,730,848 | B1 | 5/2004 | Antaya | |
| 6,869,305 | B2 * | 3/2005 | Enomoto ............... | H01R 12/68 439/422 |
| 7,507,906 | B2 | 3/2009 | Suzuki | |

* cited by examiner

3500

SYSTEM FOR COUPLING A CONDUCTIVE SUBSTRATE TO A RIBBON CABLE

CLAIM OF PRIORITY

This is the first filing made with the USPTO by the applicant regarding the present disclosure.

BACKGROUND

Field

In several fields, including for example gait analysis and bed-sore pressure monitoring of infirmed patients, it is often beneficial to couple a conductive fabric or other substantially planar or sheet-like conductive substrate to a traditional conductor, including for example insulated copper-core wire.

Consequently, systems and methods are disclosed herein for coupling a conductive substrate to a ribbon cable.

SUMMARY

A method of coupling a conductive substrate to a cable is disclosed herein, with the method comprising the steps of; providing a multi-conductor, insulated electrical cable, providing an electrically conductive substrate including for instance an electrically conductive fabric; providing a wire crimp composed of electrically conductive material wherein a first portion of the crimp is sized and shaped to puncture the insulation of and tap into at least one of the conductors of the cable, a second portion of the crimp is sized and shaped to mechanically couple the crimp to the substrate, and a third portion of the crimp is sized and shaped to couple the crimp to the cable; positioning the crimp above a specific conductor of the cable; positioning the substrate either between the cable and the crimp or above the crimp and the cable; driving the crimp into the cable and partially through the substrate, thereby creating an electrical and mechanical connection between the conductor, the substrate, and the crimp.

According to further embodiments of the present disclosure, the cable is a flat ribbon cable.

According to further embodiments of the present disclosure, the first portion of the crimp is selected from one of a flat ventral-facing edge, a sharp ventral-facing point, or a ventral-facing barb.

According to further embodiments of the present disclosure, the second portion of the crimp is selected from one of a substantially laterally extending barb, a substantially axially extending barb, a bridge between two laterally opposed tines, or a deformable portion of crimp material.

According to further embodiments of the present disclosure, the third portion of the crimp is selected from one of a substantially medially extending barb or a deformable portion that is engaged about the conductor against an anvil during the driving process.

According to further embodiments of the present disclosure, the third portion of the crimp is driven into a retaining plate disposed upon the opposing face of the cable, thereby creating a shackle.

According to further embodiments of the present disclosure, a single driving action acts upon multiple crimps at the same time.

According to further embodiments of the present disclosure, the crimp is driven by a pneumatic or electric actuator.

According to further still embodiments of the present disclosure, a system for coupling a conductive substrate to a multi-conductor insulated cable using a wire crimp is disclosed with the system comprising; a substantially planar backplate, a driver which travels along an axis normal to the backplate wherein the driver is sized and shaped to urge the wire crimp through the substrate and cable, a carrier for positioning the wire crimp over a specific conductor of the cable before it is driven therethrough.

According to further embodiments of the present disclosure, the backplate has grooves thereupon which deform laterally opposing tines of a wire crimp about a conductor when the crimp is driven thereagainst.

According to further embodiments of the present disclosure, the cable is capable of being moved laterally while the lateral position of the carrier is fixed.

According to further embodiments of the present disclosure, the lateral movement system is selected from one of a pattern of grooves extending along the long axis of the cable wherein the pattern is wider than the cable and the cable can be positioned laterally therewithin, an electronically driven linear actuator which positions the cable laterally relative to the cable, a manually adjustable screw driven linear actuator which translates the carrier laterally.

According to further embodiments of the present disclosure, the carrier is capable of being translated laterally while the lateral position of the cable position is fixed.

According to further embodiments of the present disclosure, the lateral positioning system is selected from one of, replaceable carriers which precisely position the carried over a specific conductor, an electronically driven linear actuator which translates the carrier laterally, a manually adjustable screw driven linear actuator which translates the carrier laterally.

According to further embodiments of the present disclosure, the driver is pneumatically or electrically actuated.

According to further embodiments of the present disclosure, there is a secondary driver which translates a clamp along an axis normal to the backplate thereby selectably fixing the ribbon between the backplate and the clamp.

According to further embodiments of the present disclosure, there is a secondary driver which translates a clamp along an axis normal to the backplate which holds the substrate in place against the ribbon.

BRIEF DESCRIPTION OF THE FIGURES

In the figures, which are not necessarily drawn to scale, like numerals describe substantially similar components throughout the several views. The drawings illustrate generally, by way of example, but not by way of limitation, various embodiments discussed in the claims of the present document.

FIG. **4*a*** shows an isometric view of another crimp.

FIG. **4*b*** shows an isometric view of another crimp.

Figure 5:
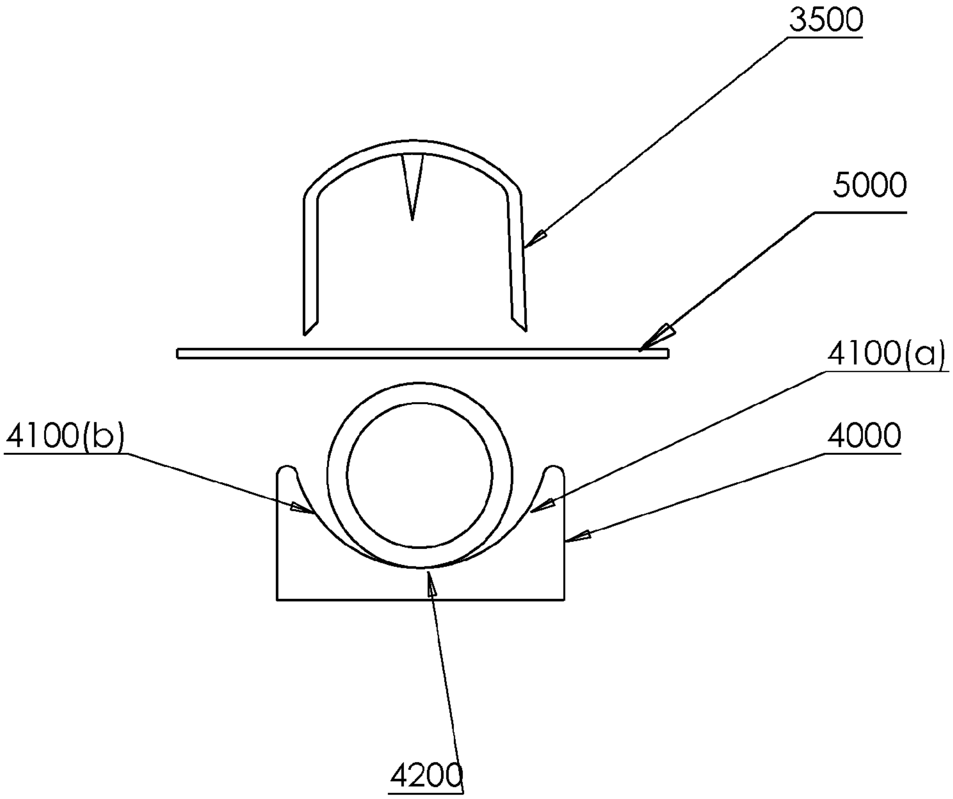

FIG. 5 shows a front view of a crimp, substrate, conductor, and anvil prior to assembly.

FIG. **5*a*** shows an isometric view of an assembled view of a crimp, substrate, and conductor.

DETAILED DESCRIPTION OF THE FIGURES

Various embodiments of the presently disclosed apparatus will now be described in detail with reference to the drawings, wherein like reference numerals identify similar or identical elements. In the drawings and in the description that follows, the term "proximal," will refer to the end of a device or system that is closest to the operator, while the term "distal" will refer to the end of the device or system that is farthest from the operator. Similar, anatomical terms of reference such as dorsal, lateral, anterior, and sagittal shall have their accepted meanings in the arts.

Figure 1:
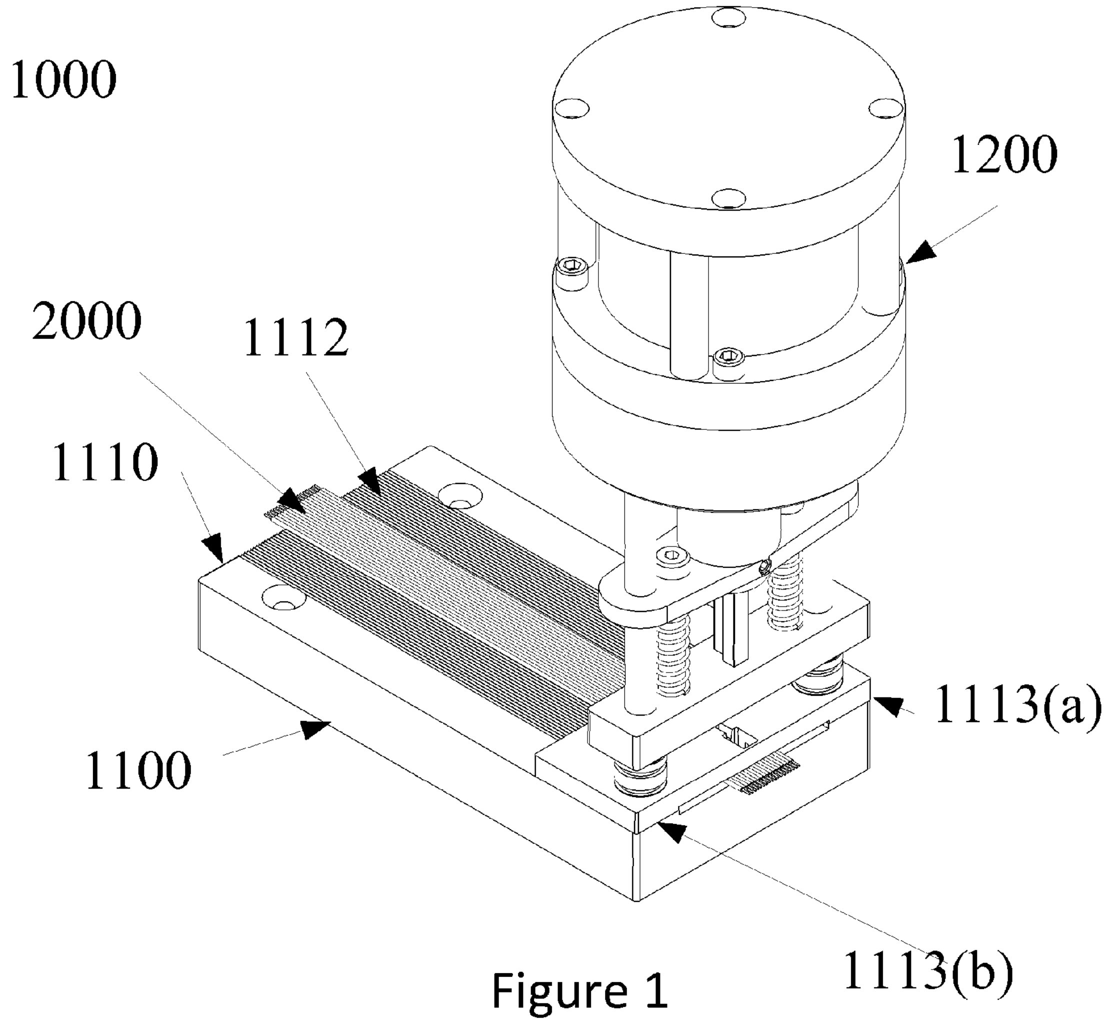
FIG. 1 shows an isometric view of system for coupling a conductive substrate to a ribbon cable.

According to a first embodiment of the present disclosure shown in FIG. 1, a Coupling System 1000 comprises a deck assembly 1100 with a press assembly 1200 coupled thereto. Deck assembly 1100 is comprised of a baseplate 1110 having a pattern of longitudinal grooves 1112 cut into a dorsal surface thereof. The pattern 1112 is substantially wider than ribbon cable 2000 which rests thereupon so that the ribbon cable 2000 can be positioned laterally within the grooves of pattern 1112. There are apertures 1113(*a* and *b*) disposed upon opposing sides of the proximal-end portion of baseplate 1110.

Figure 2:
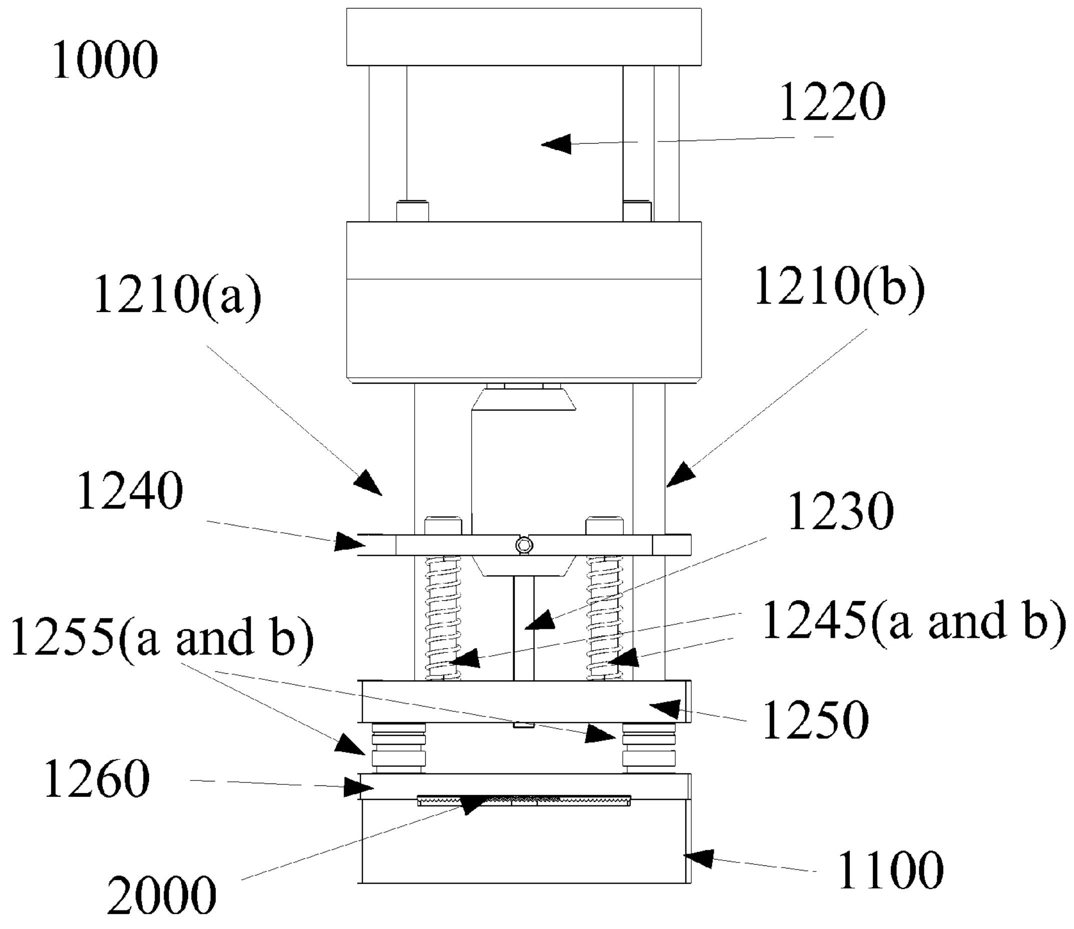
FIG. 2 shows a front view of a system for coupling a conductive substrate to a ribbon cable.

Referring now to FIG. 2, a front view of a Coupling System 1000 is shown wherein there are a pair of posts 1210(*a* and *b*) extending dorsally from baseplate 1100. There is a driver 1220 disposed near the ends of posts 1210(*a* and *b*). Driver 1220 is a pneumatic, hydraulic, or electric linear actuator which drives a ram 1230 in a substantially ventral direction. There is a platform 1240 slideably coupled to posts 1210(*a* and *b*) and rigidly coupled to ram 1230 which provides a point of support for springs 1245(*a* and *b*) which urge platform 1240 in a dorsal direction when the actuator is not engaged. The is a punch guide 1250 disposed ventrally from springs 1245(*a* and *b*) which has an aperture extending therethrough sized and shaped to accommodate the travel of ram 1230.

There are two spacer bearings 1255(*a* and *b*) disposed upon opposing sides of the dorsal face of punch guide 1250. Below punch guide 1250 is die 1260. There is an aperture extending through die 1260 sized and shaped to accommodate the ram 1230. Upon the ventral face of die 1260, there is a recess sized and shaped to engage upon and position a ribbon cable 2000.

When ram 1230 is translated ventrally, springs 1245(*a* and *b*) are compressed, thereby applying pressure to ribbon cable 2000 and holding it in place.

Figure 3:
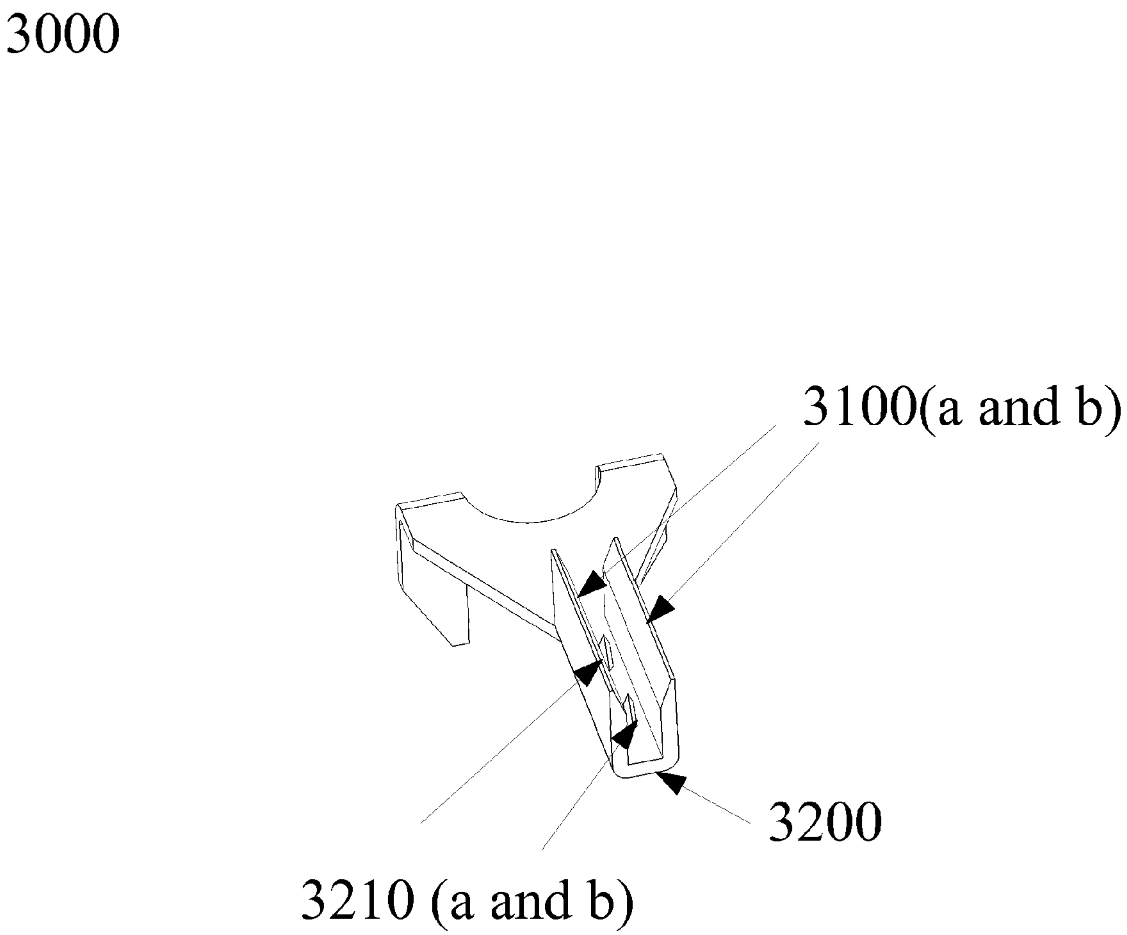
FIG. 3 shows an isometric view of a crimp.

Referring now to FIG. 3, a crimp 3000 is shown, having a proximal end portion with a substantially u-shaped profile with sharp tines 3100(*a* and *b*) extending from opposing sides of a bridge 3200. Bridge 3200 has two points 3210(*a* and *b*) sized and shaped to tap an electrical conductor through its insulation.

Figure 4A:
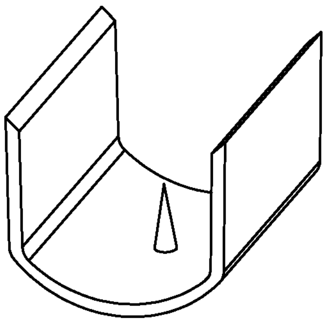
Figure 4B:
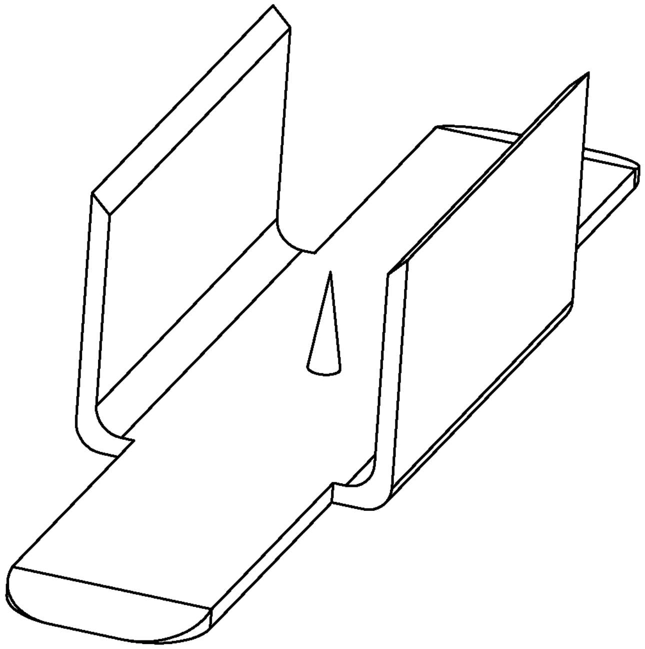

Although the crimp has been shown in the illustrations as having a proximal and distal end portion, there are further embodiments within the scope of the present disclosure according to which the crimp is substantially comprised of a u-shaped channel as is exemplified in FIG. 4*a* as well as embodiments wherein the crimp has two axial protrusions extending in opposing directions from the bridge of a u-shaped channel. These axial protrusions or the fork at the distal end portion of crimp 3000 may be deformed to engage upon a conductive substrate.

Referring now to FIG. 5, an embodiment of an anvil 4000 is shown, wherein anvil 4000 has opposing sloped sides 4100(*a* and *b*) disposed thereupon which meet at a point 4200. Anvil 3000 may be disposed upon the deck assembly 1100 with sloped slides 3100(*a* and *b*) opening dorsally. When a crimp, including for instance crimp 3000 is driven into anvil 4000, tines 3100(*a* and *b*) are urged together by sloped sides 4100(*a* and *b*) thereby reducing the distance between the tines and gripping the conductor of the cable therebetween.

Figure 5A:
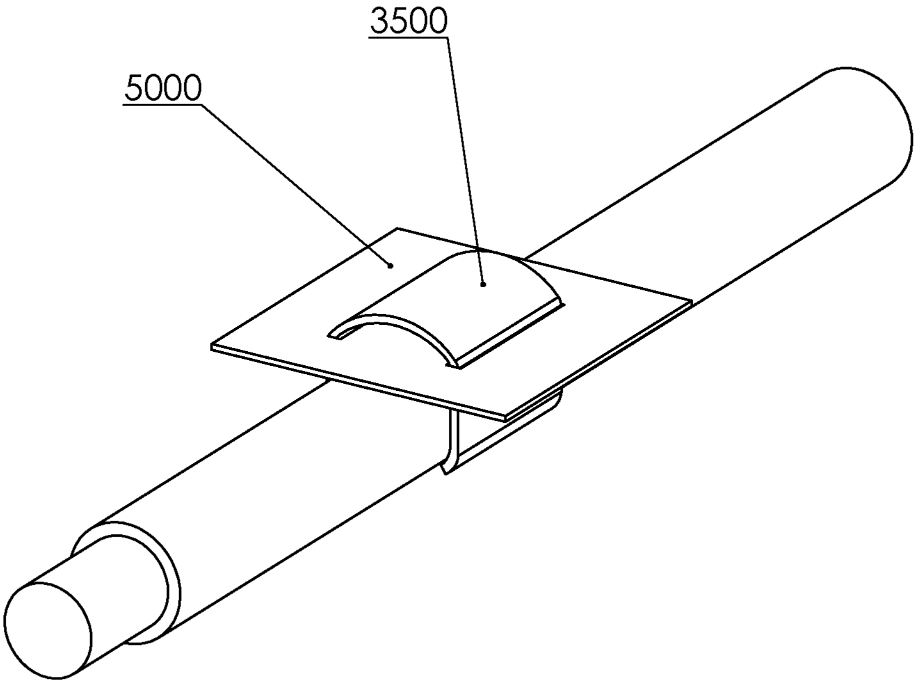

FIG. 5 shows an example of the stacking of a substrate 5000 between a crimp 3500 and an anvil 4000. FIG. 5*a* shows the assembly after the crimp has been driven down onto anvil 4000.

According to certain embodiments of the present disclosure, once a crimp, multi-conductor ribbon, and conductive substrate have been joined by the present invention a crimp 3500 has been driven into a specific conductor 6000 of a multi-conductor ribbon, thereby mechanically and electrically coupling the crimp and conductor 6000 to a conductive substrate 5000. Although crimp 3500 and substrate 5000 are mechanically coupled to the entire ribbon, they are electrically coupled only to the selected conductor 6000.

An exemplary method of using the device as shown will now be described. Initially, ribbon cable 2000 is positioned within pattern 1112 such that the aperture within die 1260 is aligned with a selected conductor within the ribbon cable. Next, ram 1230 is translated dorsally, thereby also translating die 1260 dorsally and creating a gap between die 1260 and deck assembly 1100. A portion of conductive substrate, including for instance an electrically conductive fabric is inserted between die 1260 and the ribbon cable resting upon deck assembly 1100. Next, the ram 1230 is translated ventrally, closing the gap between deck assembly 1100 and die 1260, pinching the ribbon cable and substrate therebetween and configuring the device as shown in the figures. Next, a crimp 3000 is inserted into the aperture in die 1260 and the die is further translated ventrally, thereby compressing the springs 1245(*a* and *b*) and bringing ram 1230 down upon crimp 3000. The force of ram 1230 forces tines 3100(*a* and *b*) through the substrate as well as into the space between conductors of ribbon cable 2000. The shape of the pattern 1112 directly below the crimp acts in a manner similar to that of the anvil described above, thereby closing the distance between tines 3100(*a* and *b*), thereby mechanically coupling the substrate, crimp and ribbon cable together. The points 3210(*a* and *b*) puncture the substrate, the insulation of the ribbon cable, and establish electrical connectivity between the substrate, crimp, and ribbon cable.

Within the scope of the present application and the related arts, conductive substrate shall be understood to mean the entire range of electrically conductive fabrics and flexible materials. These include but are not limited to fabrics which have a single conductive layer such as a conductive film over a non-conductive fabric layer, distinct conductive segments including for instance stripes or other patterns, fabrics with conductive strands interwoven within otherwise nonconductive fabric, films with conductive areas printed or deposited thereupon, as well as flexible circuit boards.

It will be apparent to one having ordinary skill in the mechanical arts that the presently disclosed invention may be used to place multiple crimps along a single conductor to provide strain relief as well as increase the strength and robustness of the mechanical connection between the conductor and substrate while providing a single electrical connection.

It will further be apparent to one having ordinary skill in the mechanical arts that although the steps of the method below have been illustrated using a largely manually operated machine, that the various steps of the method may be automated in production volumes without diverging from the scope of the present application.

Although the present invention has been described this section with reference to specific structures and steps, these structures and steps are intended as but one exemplary method of implementing the appended claims.

What is claimed is:

1. A system for mechanically and electrically coupling a conductive substrate to a multi-conductor insulated cable using a wire crimp, the system comprising; a substantially planar backplate, a driver which travels along an axis normal to the backplate wherein the driver is sized and shaped to urge the wire crimp through the substrate and cable, a carrier for positioning the wire crimp over a specific conductor of the cable before it is driven therethrough wherein there is a lateral movement system selected from one of a pattern of grooves extending along the long axis of the cable wherein the pattern is wider than the cable and the cable can be positioned laterally therewithin, an electronically driven linear actuator which positions the cable laterally relative to the driver, a manually adjustable screw-driven linear actuator which translates the carrier laterally.

2. The system of claim 1, wherein the backplate has grooves thereupon which deform laterally opposing tines of a wire crimp about a conductor when the crimp is driven thereagainst.

3. The system of claim 1, wherein the cable is capable of being moved laterally while the lateral position of the carrier is fixed.

4. The system of claim 1, wherein the carrier is capable of being translated laterally while the lateral position of the cable position is fixed.

5. The system of claim 4, wherein the lateral positioning system is selected from one of, replaceable carriers which precisely position the carried over a specific conductor, an electronically driven linear actuator which translates the carrier laterally, a manually adjustable screw driven linear actuator which translates the carrier laterally.

6. The system of claim 1, wherein the driver is pneumatically or electrically actuated.

7. The system of claim 1, wherein there is a secondary driver which translates a clamp along an axis normal to the backplate thereby selectably fixing the ribbon between the backplate and the clamp.

8. The system of claim 1, wherein there is a secondary driver which translates a clamp along an axis normal to the backplate which holds the substrate in place against the ribbon.

* * * * *